Oct. 20, 1970 S. C. FORREST, JR 3,535,640
REDUCTION OF DISTORTION AND LOSSES IN CABLE TELEVISION DISTRIBUTION SYSTEMS
Filed June 16, 1966 2 Sheets-Sheet 1

INVENTOR.
STANLEY C. FORREST, JR.
By White & Haefliger
ATTORNEYS.

INVENTOR.
STANLEY C. FORREST, JR.
BY White & Haefliger
ATTORNEYS.

United States Patent Office 3,535,640
Patented Oct. 20, 1970

3,535,640
REDUCTION OF DISTORTION AND LOSSES IN CABLE TELEVISION DISTRIBUTION SYSTEMS

Stanley C. Forrest, Jr., Santa Ana, Calif., assignor, by mesne assignments, to Anaconda Wire and Cable Company, New York, N.Y., a corporation of Delaware Filed June 16, 1966, Ser. No. 558,054
Int. Cl. H04h *1/00*
U.S. Cl. 325—308 5 Claims

ABSTRACT OF THE DISCLOSURE

This invention concerns reduction of distortion and losses in cable television distribution systems through the provision of a tap associated network for effecting reduction of differential attenuation as measured at the subscriber equipment.

This invention relates generally to cable television, and more particularly concerns reduction of distortion and losses in distribution systems and at subscriber equipment.

In cable television, that portion of the system relating directly to transmitting signals between the main trunk system and the subscribers' receiving equipment is called the distribution system. Such a system starts at a bridger-amplifier which is part of the main trunk system, and the distributiton cable extending from that amplifier has a number of distribution amplifiers or line extenders connected in series with it. Between such amplifiers there are a number of taps, which may consist of taps making contact with the center conductor of the cable by piercing the insulation, or they may consist of matching transformers, or directional taps or couplers, the latter also providing directivity (isolation from the output). Such taps introduce into the system an insertion loss, which varies inversely with tap loss. Insertion loss represents attenuation of cable transmitted signals, whereas tap loss represents attenuation of signals being distributed to the subscriber equipment.

It is found that the signals transmitted from the cable to the subscriber equipment undergo differential attenuation as a function of frequency. For example, near the output of a distribution amplifier the channel 13 signal level is higher than channel 2 signal level, whereas closer to the following distribution amplifier these levels may be more nearly equal, or channel 2 signal level may even be higher than channel 13 signal level. In addition, insertion and tap losses together with losses due to the run of cable from the tap to the subscriber equipment typically bring about the result that channel 13 signal level is much higher than channel 2 signal level as measured at the subscriber equipment where the associated tap is near the output of an amplifier, and channel 2 level is much higher than channel 13 signal level as measured at the subscriber equipment where the associated tap is near the input to the next distribution amplifier. Such differences in signal level at the subscriber equipment contribute to undesirable distortion and low quality of the picture produced at the subscriber's equipment. Further, insertion loss is normally quite flat, i.e. equal at all frequencies, which further contributes to distortion in the distribution amplifiers, inasmuch as they are constructed to develop more again at higher frequencies than at lower frequencies in order to compensate for characteristic signal attenuation by the cable.

It is a major object of the present invention to overcome the above difficulties and problems through the provision of a system wherein differential attenuation as a function of frequency, i.e. tilted loss, is substantially reduced, so that signal levels of different channels transmitted by any tap are approximately equal at the subscriber equipment, although the levels transmitted by different taps may differ. This object is realized in accordance with the invention by utilizing a tap associated network for effecting reduction of differential attenuation as measured at the subscriber equipment, and in particular the network is located at the input side of a splitter circuit which distributes television signals to multiple television receivers with the network controlling differential tap loss. As an example, the network typically includes impedance to effect approximate equalization of channels 2 and 13 television signal levels as measured at the subscriber equipment; the network impedance providing more tap loss at channel 13 than at channel 2 where its associated tap is closer to an amplifier preceding that tap than to a following amplifier, and alternatively the network impedance providing more tap loss at channel 2 than at channel 13 where its associated tap is closer to the following amplifier than to the preceding amplifier.

A further object of the invention is to provide tap impedance to effect relatively greater insertion loss at higher signal frequencies than at lower signal frequencies, thereby to reduce distortion in the distribution amplifiers.

A still further object is to further improve signal level control, as described in the co-pending application of William A. Rheinfelder, entitled, "Cable Television Signal Level Optimization."

These and other objects and advantages of the invention, as well as the details of illustrative embodiments, will be more fully understood from the following detailed description of the drawings, in which.

Figures 1, 3:
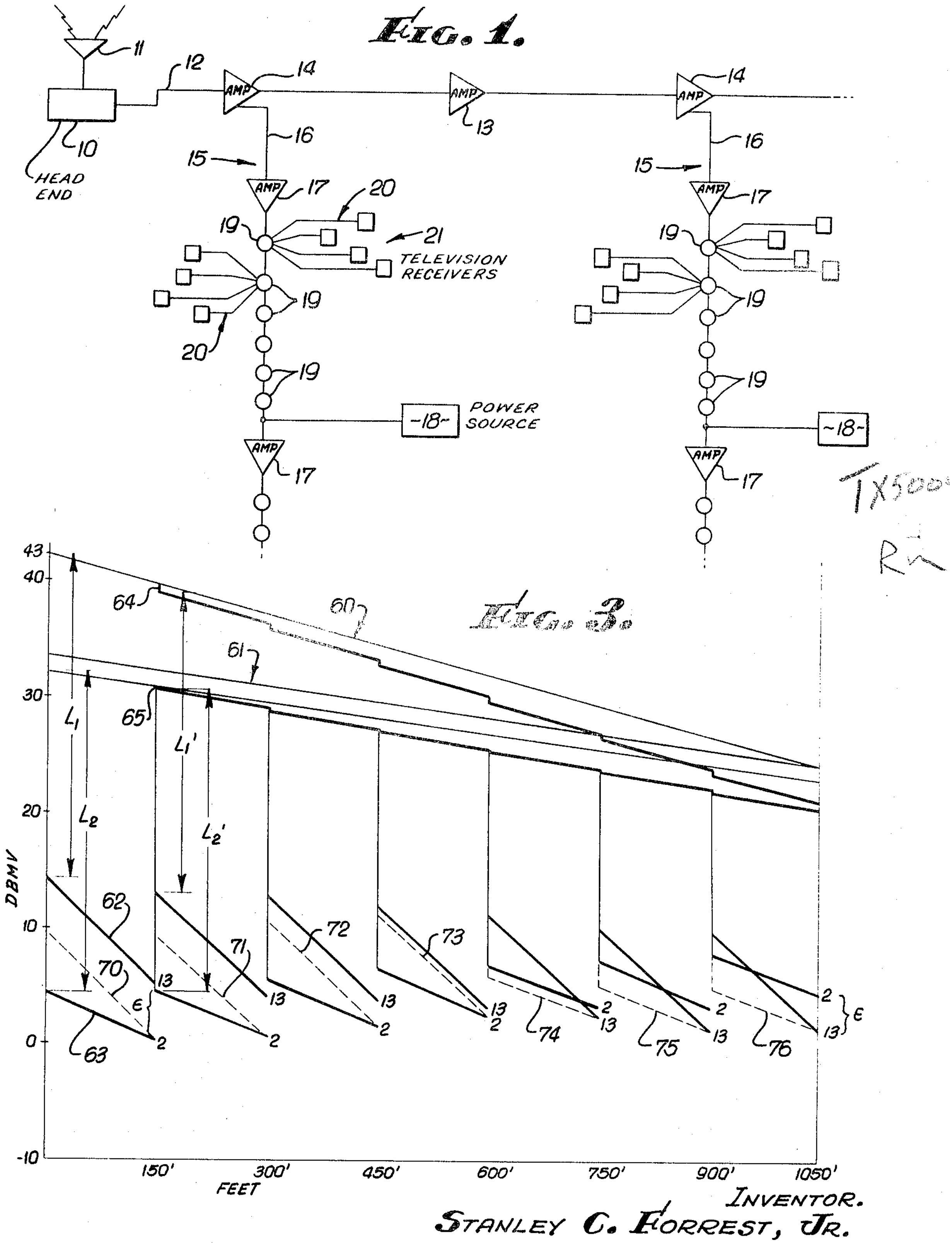
FIG. 1 is a generalized block diagram showing a portion of a cable television system.
FIG. 3 is a distribution level diagram.

Referring first to FIG. 1, the illustrated cable television system includes head end equipment 10 with antenna 11 to pick up broadcast multi-channel television signals. Such equipment is known and is operable to correct and adjust the signal level for each channel, with separate correction for picture and sound carriers. Such equipment also typically includes preamplifiers, demodulators, modulators for each channel, together with a multi-channel combining network, the output of which is applied to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers feeder lines 15 are run along a row of subscribers' houses. The feeder lines include coaxial cable 16 and line extender amplifiers 17 operable to compensate for the loss in the feeder system. As an example, each feeder line may include four to ten or more line extender amplifiers. Power to the cables is supplied at permissible levels as by the transformers or other sources 18. Between successive amplifier 17 directional taps or couplers 19 are provided, typically with multiple outputs 20 to which individual home receivers 21 are connected. For example, a four house tap is typically used every 150 feet.

Figure 2:
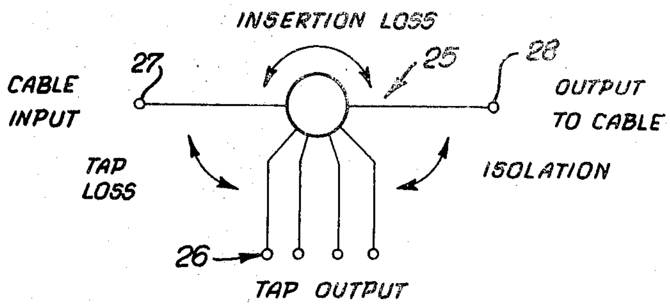
FIG. 2 is a diagrammatic representation of a distribution cable tap.

FIG. 2 illustrates a tapping device 25 which suppresses reflections, and in addition is matched in every direction. In this regard, reflections present in a cable due to mismatch (faulty termination) combine with the original signal to produce voltage peaks and dips by addition and subtraction. The ratio of the peak to dip voltage is termed VSWR, and a perfect match with zero reflections produces a VSWR of 1. For freedom from ghosting, most matches in a cable television system must have a VSWR of 1.25 or less. In FIG. 2, tap loss is determined by position in the system, and various values can be constructed, ranging from 10 db to more than 30 db for a 4-way directional coupler. Insertion loss varies generally inversely with tap loss, in the sense that the greater the drop in gain at the tap outputs 26, relative to the signal level at the cable input 27, the less the drop in gain at the output 28 to the cable. FIG. 2 also shows the existence of "isolation" between tap and output terminals 26 and 28. "Isolation" refers to the ability of the tap to suppress reflections traveling to the left in FIG. 2 as inputs at point 28, whereby high isolation results in low reflection signal strength at tap output 26. A high quality tapping device providing isolation between tap and output terminals is termed a directional coupler, directivity being measured by the difference between tap loss and isolation. The greater this difference in db, the greater the directivity. Directional couplers with directivity of 15 db at channel 2 and 10 db at channel 13 are adequate for all cases. See in this regard, "CATV System Engineering" by William A. Rheinfelder, published January 1966 by TAB Books, Thurmont, Md.

The amplifiers seen at 13, 14 and 17 may advantageously be of the solid state type described in the co-pending application of William A. Rheinfelder entitled "Cable Television Signal Distortion Reduction," such amplifiers affording relatively high signal output levels, especially in a cable powered system. Optimized distribution signal levels at the outputs of the distribution amplifiers may be in accordance with the copending application of William A. Rheinfelder entitled "Cable Television Signal Level Optimization."

FIG. 3 shows an optimized distribution system level diagram, using 4-way directional taps with 150 foot tap spacing. The ordinate scale gives signal level in db mv. and the abscissa scale gives distance in feet. Starting at the level 43 db mv. for channel 13, the signal drops along a sloping line 60 until it hits the lowest point at about 1050 feet, where it is amplified and brought up to a level of 43 db mv. The line 60 represents only attenuation of 0.412 inch aluminum cable. A similar line for channel 2 is see at 61. At the 0 foot location the first tap which is at the distribution amplifier produces 28.5 db mv. loss $L_1$ at channel 13 and 28.0 db mv. loss $L_2$ for channel 2. The signal then goes through the house drop (slanted line 62 for channel 13 and line 63 for channel 2) and arrives at the TV set with a level of 5.5 db mv. at channel 13 and 0.5 db mv. at channel 2. While the effective length of the house drop cable running from the tap to the subscriber equipment may vary, 150 feet is reasonable to select in view of the aging of the usual lower quality house drop cable.

At the 150 foot location another tap produces 26.5 db mv. loss $L_1'$ at channel 13 and 26 db mv. tap loss at channel 2. As the tap loss lessens, insertion loss is incurred in the distribution system, as seen at 64 and 65. The level at TV sets fed from this tap are 4.5 db mv. for channel 13 and 1.0 db mv. for channel 2. The distance between repeater amplifiers in the system is made such that the difference $\epsilon$ (first tap) between the unequalized db mv. levels of channels 13 and 2 at the TV sets fed from the first tap is about equal to, but opposite in sign from, the difference $\epsilon$ (last tap) between the db mv. levels of channels 13 and 2 at TV sets fed from the last tap. Also, in accordance with the invention, the differences $\epsilon$ as described are substantially eliminated by virtue of equalization to be described below. Results include higher quality pictures at the subscriber equipment, substantially improved system signal to noise ratio, the enablement of use of amplifiers with reduced gain requirements, and decrease in flat loss with resultant increase in overload levels of amplifiers, without windshield wiper distortion at the TV sets.

From what has been said, it is clear that the system includes multiple solid state wire-band, R.F. amplifiers connected in series with the distribution cable 16 at predetermined intervals to amplify the transmitted signals, and means including directional taps connected to tap television signals from the cable between the amplifiers for distribution to the subscriber equipment, the amplifiers compensating for signal attenuation by the cable and taps. Also, it is clear that the signals undergo differential (tilted) attenuation as a function of signal frequency. In accordance with the invention, the above means includes a network for effecting substantial reduction of differential attenuation, as measured at the subscriber equipment, such reduction having the effect of reducing substantially the differences $\epsilon$ (first tap) and $\epsilon$ (last tap) referred to above.

In this regard, the network adjusts the relative tap losses $L_1$ and $L_2$ at the taps, so that for taps closer to the output of an amplifier the channel 13 house drop levels are reduced as indicated by broken lines 70–73 in FIG. 3; similarly, for taps closer to the input of the next amplifier, the channel 2 house drop levels are reduced as indicated by broken lines 74–76 in FIG. 3. Such reductions are effected so as to approximately equalize the channels 2 and 13 signal levels at the subscriber's equipment, for a selected effective modular length of house drop cable.

Figure 4:
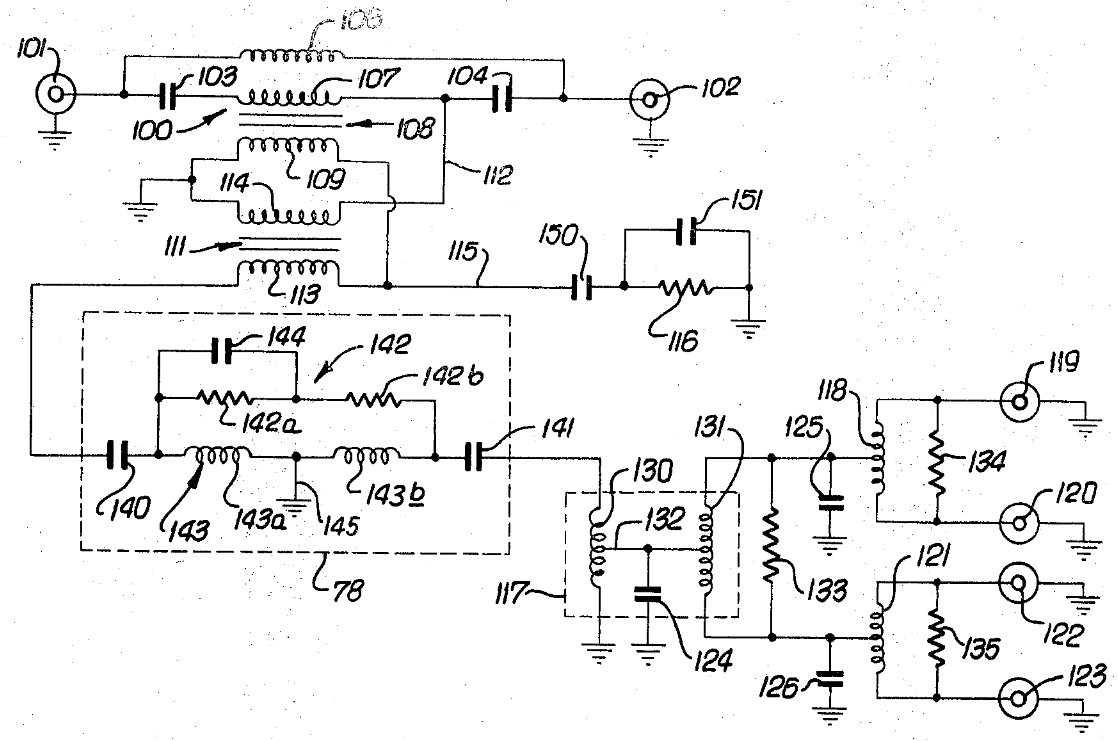
FIG. 4 is a circuit diagram showing a directional tap in further detail.

One such network is indicated within the broken lines 78 in FIG. 4, the latter showing a directional tap such as is usable in the FIG. 1 system. Network 78 controls differential tap loss, and a splitter circuit is connected at the output side of network 78 to distribute television signals to multiple television receivers.

The directional tap seen in FIG. 4 includes a path 100 connected between cable input and output points 101 and 102, and incorporating coupling capacitors 103 and 104. A connection 105 by-passes cable transmitted AC power for the amplifiers around the path 100, and includes a choke 106. Path 100 includes the primary 107 of a transformer 108 operable to sense cable transmitted signal signal current direction, the secondary 109 having an output applied to network 78. Another transformer 111 has a primary 114 connected at 112 with path 100 and a secondary 113 whose output is applied to network 78, the transformer 111 sensing cable transmitted signal voltage and applying its output in additive relation with the output of transformer 108 to network 78. The difference between the transformer outputs appears at 115, and a dummy load 116 absorbs the echo signal.

Tap loss is derived principally at network 78, the output from which is applied to bridge 117 used for impedance matching with respect to the load. From that bridge the signal is applied via center tapped hybrid coil 118 to tap outputs 119 and 120, and via center tapped hybrid coil 121 to tap outputs 122 and 123, the television receivers being input connected to those output terminals. The network achieves isolation of the outputs, and capacitors 124–126 are used for better frequency response. Bridge 117 includes coils 130 and 131 with taps connected at 132, and a resistor 133 is connected across coil 131. Resistors 134 and 135 are connected across coils 118 and 121.

Equalizing network 78 includes blocking capacitors 140 and 141, and parallel branches 142 and 143. Branch 142 includes series connected resistances **142*a* and 142*b*, capacitance 144 being connected across resistance 142*a*. Branch 143 includes series connected in ductances 143*a* and 143*b*, each connected to ground at 145. The effect of a network of the type 78** upon relative tap loss at high and low frequencies is indicated by the shifts embodied in broken lines 70–76 of FIG. 3; i.e. this network 78 includes impedance to effect approximate equalization of channels 2 and 13 television signals as measured at subscriber equipment.

Typical values (illustrative only) for the FIG. 4 elements are as follows:

| | |
|---|---|
| Transformer 108 | Ferrite, Q–2 material. |
| Coil 107 | 3 turns. |
| Coil 109 | 10 turns. |
| Transformer 111 | Ferrite, Q–2 material. |
| Coil 113 | 10 turns. |
| Coil 114 | 3 turns. |
| Network 78 | |
| Resistor 142a [1] | 150Ω.[2] |
| Resistor 142b [1] | 150Ω.[2] |
| Coil 143a [1] | 4 turns.[2] |
| Coil 143b [1] | 4 turns.[2] |
| Capacitor 144 [1] | 20–60 pfd.[2] |
| Capacitor 140 [1] | 50–300 pfd.[2] |
| Capacitor 141 [1] | 50–300 pfd.[2] |
| Coils: | |
| 106 | 20 turns, ¼" dia. |
| 130 | 4+4 turns. |
| 131 | 4+4 turns. |
| 118 | 4+4 turns. |
| 121 | 4+4 turns. |
| Capacitors: | |
| 103 | .001 μfd. |
| 104 | .001 μfd. |
| 150 | .001 μfd. |
| 151 | 2–15 pfd. |
| 124 | 2–15 pfd. |
| 125 | 2–15 pfd. |
| 126 | 2–15 pfd. |
| Resistors: | |
| 116 | 75Ω |
| 133 | 75Ω. |
| 134 | 150Ω. |
| 135 | 150Ω. |

[1] Variable.
[2] Typical only.

Further, the network as seen in FIG. 4 can be made to compensate for signal level attenuation in response to temperature change of the cable running from the network to the home receiver equipment. For this purpose, various impedances such as temperature sensitive capacitors and resistors in the network are selected to produce desired compensation. These impedances exposed to substantially the same outdoor temperature as the cable.

Figure 5:
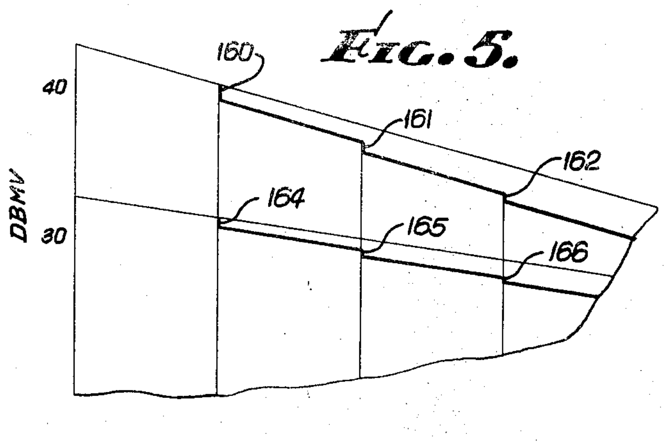
FIG. 5 is a modified distribution level diagram.

FIG. 5 illustrates the provision for greater insertion loss at higher signal frequencies than at lower signal frequencies. Thus, insertion losses 160–163 at the taps for channel 13 are each substantially greater than insertion losses 164–166 at the same taps for channel 2, i.e. losses 160–163 are about double the respective losses 164–166, in db. FIG. 5 corresponds to the upper left portion of the FIG. 3 level diagram. As a result, insertion loss is made more like cable loss, (i.e. more loss at higher frequencies) so that the amplifiers which are set to compensate for cable loss are at the same time enabled to compensate for insertion loss with less distortion. Such relative insertion losses are achieved by selection of tap impedance, as for example turns ratios of the transformers 108 and 111.

I claim:

1. In a cable television system, a distribution cable to transmit multiple channel television signals for reception by subscriber equipment, multiple solid state wideband R.F. distribution amplifiers connected in series with the cable at predetermined intervals to amplify the transmited signals, and means including taps connected to tap television signals from the cable between said amplifiers for distribution to the subscribed equipment, the amplifiers compensating for signal attenuation by the cable and taps, the signals transmitted from the cable to the subcriber equipment undergoing differential attenution as a function of signal frequency, said means including a network connected with each tap for effecting substantial reduction of said differential attenuation so as substantially to equalize different frequency signal levels at the subscriber equipment, the cable distance between successive distribution amplifiers being such that the difference between channel 2 and 13 signal levels as measured at the subscriber equipment fed from the network and first tap following a distribution amplifier and with a house drop cable length of between 100 and 150 feet is about equal to but opposite in sign from the difference between channel 2 and 13 signals levels at subscriber equipment fed from the network and last tap following that distribution amplifier prior to the next distribution amplifier and with the same house drop cable length.

2. The system of claim 1, in which cable transmitted signals undergo insertion loss at the taps, the taps including impedance to effect relatively greater insertion loss at higher signal frequencies that at lower signal frequencies.

3. The system of claim 1 wherein said certain networks are alike and are the same as said other networks.

4. The system of claim 1 wherein each tap includes:

(a) a first path connected in series with the cable and incorporating a first transformer primary winding, there being a first transformer secondary winding coupled to said primary winding, (b) a second transformer having primary winding connected with said first path and a secondary winding connected to in series between the first transformer secondary winding and the input to said network.

5. The system of claim 4 including a low frequency AC power source connected with said cable, and an AC power transmitting path connected in series with the cable and in by-passing relation to said first transformer primary winding, said path including a choke.

References Cited

UNITED STATES PATENTS 3,064,195 11/1962 Freen ............ 325—308

OTHER REFERENCES

Maintenance of CATV Systems by Hallett, Telephone Engineer and Management, vol. 69, No. 22, Nov. 15, 1965, pp. 37–41.

TV Distribution Systems and Antenna Techniques by Beever, Howard W. Soms & Co. (1958), pp. 92–95.

ROBERT L. GRIFFIN, Primary Examiner

R. S. BELL, Assistant Examiner

U.S. Cl. X.R.

178—6

UNITED STATES PATENT OFFICE
CERTIFICATE OF CORRECTION

Patent No. 3,535,640 Dated October 20, 1970

Inventor(s) Stanley C. Forrest, Jr.

It is certified that error appears in the above-identified patent and that said Letters Patent are hereby corrected as shown below:

Column 6, lines 34 and 35; "3. The system of claim 1 wherein said certain networks are alike and are the same as said other networks." should read -- 3. The system of claim 1 wherein the networks are alike. --

Column 6, line 43; "connected to in series between the first transformer" should read -- connected in series between the first transformer --

Signed and sealed this 15th day of June 1971.

(SEAL)
Attest:

EDWARD M.FLETCHER,JR.
Attesting Officer

WILLIAM E. SCHUYLER, JR.
Commissioner of Patents